June 12, 1951     C. R. JOHN     2,556,760
GAUGING DEVICE FOR MAGNETO REPLACEMENT
Filed Feb. 13, 1946     2 Sheets-Sheet 1
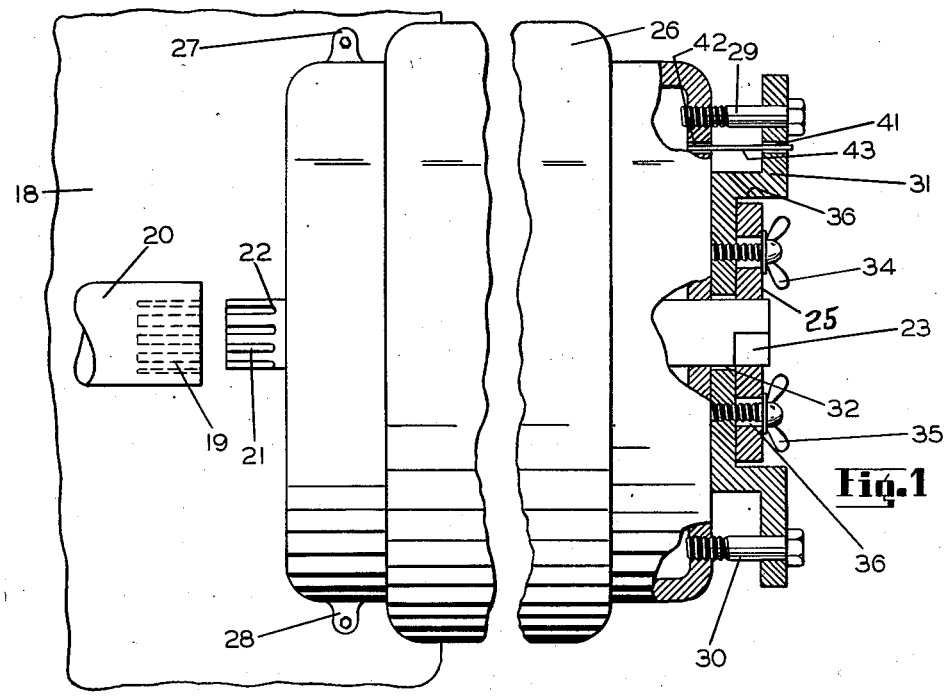
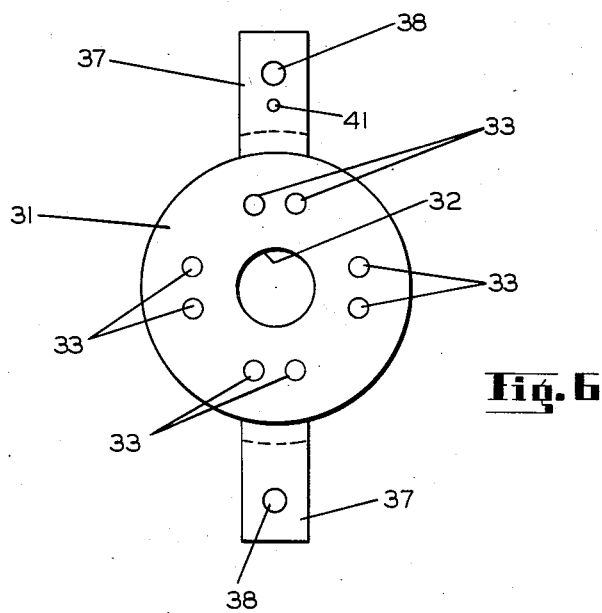
INVENTOR.
CHARLES R. JOHN
BY
HIS ATTORNEYS June 12, 1951 C. R. JOHN 2,556,760
GAUGING DEVICE FOR MAGNETO REPLACEMENT
Filed Feb. 13, 1946 2 Sheets-Sheet 2
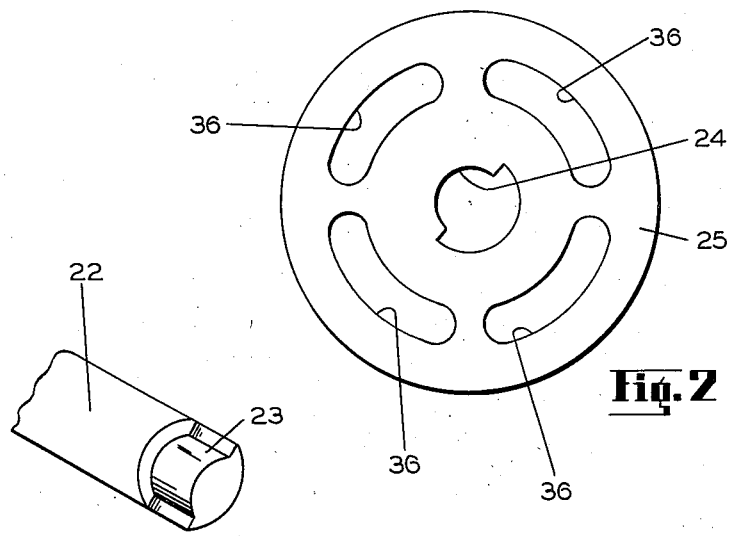
Fig. 2
Fig. 4
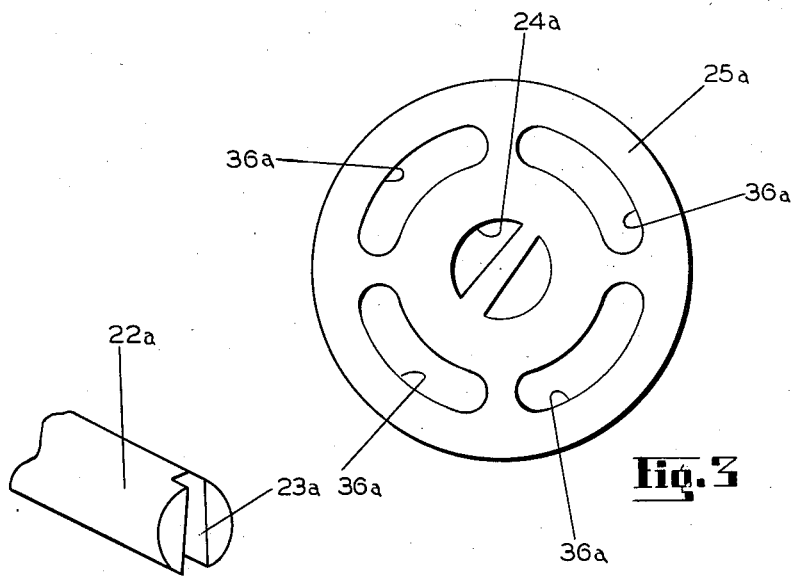
Fig. 3
Fig. 5
INVENTOR.
CHARLES R. JOHN
BY
HIS ATTORNEYS Patented June 12, 1951

2,556,760

UNITED STATES PATENT OFFICE 2,556,760

GAUGING DEVICE FOR MAGNETO REPLACEMENT

Charles R. John, Cincinnati, Ohio

Application February 13, 1946, Serial No. 647,266

6 Claims. (Cl. 33—181)

1

This invention relates to a device for magneto replacement. The invention pertains more particularly to a fixture, by which the angular relation of the magneto shaft of the removed magneto to the magneto housing, with the engine timing shaft in a given angular position, is recorded so that the shaft of a replacement magneto may be adjusted and maintained in the same angular relation relative to its housing.

Magnetos, supplying firing ignition to internal combustion engines, must be timed to deliver the ignition spark to the cylinders as the pistons reach firing position, and it is conventional, in such engines, to provide a splined timing shaft, which rotates with exact relation to piston positions by being geared to the crankshaft, and the magneto must be coupled to this timing shaft with the magneto ignition elements positioned in an exact relation thereto, so that ignition sparks are delivered at proper piston positions. Therefore, in replacing magnetos it is very important that the shaft of the replacement magneto be positioned in its housing in an exact relation to the engine, before the magneto is mounted on the engine and the magneto shaft and engine timing shaft are coupled.

In the past, it has been the practice to remove magnetos from internal combustion engines without recording the angular relation between the timing shaft and the magneto shaft, or between the latter and the magneto housing. Thus, accidental turning of the magneto shaft requires that a trial and error timing operation be carried out before the magneto can be returned and coupled fast to the timing shaft in timed relation or, in case another magneto is being used as a replacement, the same kind of trial and error timing adjustment must be carried out. Such trial and error adjustment has, in the past, been aided by marks placed on the magneto housing by magneto manufacturers, to indicate when the magneto shaft is positioned to correspond to one of the pistons' firing position, whereupon, if the said piston is moved to firing position, the magneto can be coupled to the timing shaft and proper timing thus achieved. In actual practice, even with such aids, especially on complicated aeroplane motors, the adjustment is one of tedious trial and error, because of the magneto shaft accidentally turning from marked position, the splines in the coupling failing to mesh, or the timing shaft and pistons accidentally moving.

This invention provides a means for replacing a magneto on an engine without any adjustment of the engine whatsoever, whereby the time re-

2 quired to so place the magneto in position is reduced to that requiring the services of a single man for but a few minutes. The invention is for use only when a magneto is to be removed from an engine, and a duplicate replaced thereon, or the removed one replaced. The angular relation of the shaft and housing of the already installed magneto, with the engine timing shaft in a given angular position, is recorded on the fixture, which is applied to the old magneto and, then, the fixture and old magneto are taken off the engine, which is left in the position at which it stopped. The fixture is removed from the old magneto and applied to the replacement magneto, whose shaft is turned until it conforms exactly to the angular relation of shaft and housing recorded by the fixture, and the applied fixture and replacement magneto are then bolted together and the magneto shaft connected to the engine timing shaft and its housing bolted to the engine, the fixture then being removed. By use of this fixture, no attention need be paid to the position of the breaker points in the magneto, or the position of the pistons in the cylinders. The fixture maintains the shaft of the replacement magneto in the angular relation to the housing, that was recorded by the fixture.

Therefore, the principal object of this invention is to provide a fixture for making easy the replacement of a magneto on an engine, the use of which eliminates any trial and error setting of the engine or the magneto shaft.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claims. Structures constituting preferred embodiments of my invention are illustrated in the accompanying drawings, forming a part of this specification, in which:

Fig. 1 is a plan view showing parts of an engine casing and the engine timing shaft, a magneto housing and its shaft, and, in section, the fixture comprising the invention attached to the housing of the magneto.

Fig. 2 is a front elevation of the settable apertured plate of the fixture, which fits on that end of the magneto shaft opposite to that which couples with the timing shaft of the engine.

Fig. 3 shows a modified form of the plate of Fig. 2.

Fig. 4 shows a shaped end on the magneto shaft, which fits into the aperture of the plate of Fig. 2.

Fig. 5 shows the shaped end of the magneto shaft adapted to fit into the aperture of the plate of Fig. 3.

Fig. 6 shows the frame of the fixture, to which the plates of Fig. 2 or Fig. 3 are fastened.

In the drawings, the same reference numerals refer to the same parts throughout the several views.

Referring to Fig. 1, the engine timing shaft 20 has internal splines 19, adapted to fit external splines 21 on magneto shaft 22. The end of the magneto shaft opposite the end joining to the timing shaft is preferably formed as shown at 23 in Fig. 4, or formed as shown at 23a in Fig. 5. A housing 26 (Fig. 1) is provided for the magneto and such housing is adapted to be bolted on to the engine casing 18 by means of flanges, 27 and 28, so that there is maintained a fixed relation between the engine casing and the magneto housing.

The fixture or device of my invention comprises a frame 31, having a circular central portion provided with a central hole 32 of such size as to permit the end of shaft 22 to protrude therethrough and turn freely therein. The frame has a pair of laterally-extending, offset ears 37 (see Fig. 6), provided with holes 38 to receive the bolts 29 and 30, for securing the frame to the end of the magneto housing. These holes 38 may be so located as to permit bolts 29 and 30 to screw into the threaded holes in the housing used to bolt an end cap in place. Aperture 41 in ear 37, and aperture 42 in the magneto housing are provided to receive positioning pin 43 to guard against a 180 degree error in attaching frame 31 to the housing. A series of holes 33 is provided in the central portion of frame 31, equi-distant from the center thereof. A plate 25 (see also Fig. 2) is provided, which may lie against the central portion of frame 31 and revolve thereon, said plate having an irregular central opening 24 (Fig. 2) adapted to fit over the formed end 23 of shaft 22 in but one angular relation, in which said plate is nonrotatably received on the end of said shaft. This irregular central opening may take the form shown at 24a (Fig. 3) to fit the formed end 23a of shaft 22a (Fig. 5). The plate, 25 or 25a, has four arcuate slots, 36 or 36a, which are concentric with the center of said plate. Wing bolts, 34 and 35, are provided, which may pass through the arcuate slots, 36 or 36a, and screw into the threaded holes 33 of the frame 31, whereby the plate may be clamped to the frame in a definite angular relationship.

In operation, assuming that the shaft 22 (Fig. 1) is engaged with the timing shaft 20 by means of the spline connections, and that the magneto is bolted to the engine casing by means of ears 27 and 28, first, the frame 31 is bolted to magneto housing 26 by means of bolts 29 and 30. Next, the plate 25 (or in case the modified form is used, plate 25a) is fitted in position over the end of shaft 22 and clamped to the frame 31 tightly by means of wing bolts 34 and 35. Following this, the magneto may be removed from the timing shaft and the engine casing. The bolts 29 and 30, then, are withdrawn and the frame 31 together with the plate attached thereto are removed from the old magneto. The shaft 22 of the replacement magneto is turned until the opening in plate 25 clamped to frame 31 will slip thereon with the bolt holes 38, for the bolts 29 and 30, in alignment with the corresponding bolt holes on the magneto housing, and the bolts 29 and 30 are then secured in place in the housing, fastening the fixture thereto. By this means, the shaft 22 of the replacement magneto is accurately positioned with reference to the housing of the magneto, in the same angular relation occupied by the shaft of the old magneto as recorded by the fixture. Because frame 31 of the fixture is fastened to the magneto housing by bolts 29 and 30, and the plate 25 is clamped in relation to frame 31 with the irregular central opening 24 engaging the formed end 23 of magneto shaft 22, the magneto shaft is maintained in the angular relation to the magneto housing that was recorded by the fixture. While such angular relation is maintained, the replacement magneto housing 26 is bolted to the engine casing 18, and the replacement magneto shaft 22 is connected to the engine timing shaft 20. The fixture can then be removed. Assuming that the engine timing shaft 20 has not been disturbed after removal of the old magneto, the replacement magneto will be connected to the engine timing shaft in proper timed relation, and no other timing of the replacement magneto is necessary.

From the foregoing it will be seen that the setting of plate 25 on frame 31 records the angular relation of the shaft and housing of the removed magneto, which setting may then, by means of the fixture, be easily transferred to the new magneto.

Referring to Figs. 2 and 3, and the corresponding Figs. 4 and 5, it will be apparent that any shape on the end of the magneto shaft 22 can be used to position plate 25 accurately, as long as the shape is only such that there is only one angular relation in which the two will fit together.

Another novel feature of this invention is that the plate 25, when fixed in position on the frame 31 bolted to the housing, actually holds the shaft 22 so that there is no danger of accidental movement of it, while the magneto is being mounted.

My novel method of replacing engine magnetos in timed relation to the engine timing shaft has, as its first step, the recording of the angular relation of the old magneto shaft and housing, with the engine timing shaft in a given position, while the old magneto is assembled with the engine casing and connected in timed relation to the engine timing shaft in such position. This step may be accomplished by fastening frame 31 to the housing of the old magneto, rotating plate 25 on the frame until irregular opening 24 fits the formed end 23 of shaft 22, and then clamping plate 25, in such angular relation, to frame 31 by wing bolts 34 and 35. This makes a record, in the device comprising plate 25 and frame 31, of the angular relation of shaft 22 to magneto housing 26, when said shaft and housing are connected in timed relation to the engine casing 18 and timing shaft 20, with said shaft 20 in a given position. The second step consists in removing the old magneto from its assembled relation. The third step consists in adjusting the shaft of a replacement magneto into an angular relation with its housing identical with the angular relation recorded by said device. This step may be carried out by removing frame 31, with plate 25 clamped thereto, from the old magneto, and fastening it to the replacement magneto while rotating shaft 22 of the replacement magneto to the angular relation in which it fits the opening 24 of plate 25. This maintains the angular relation so long as frame 31 is fastened to the housing of the replacement magneto. The final step is the assembling of the replacement magneto on the engine casing and the connecting of the shaft of the replacement magneto to the engine timing shaft, which has remained in the position it occupied when the old magneto was removed, while maintaining the recorded angular relation by frame 31, to which plate 25 is clamped. When the assembly is completed, frame 31 may be removed from the housing 26 of the replacement magneto, carrying with it plate 25.

I am aware that the mechanism shown herein may be varied considerably without departing from the spirit of my invention and, therefore, I claim my invention broadly, as indicated by the appended claims.

Having thus described my invention, what I claim as new and useful, and desire to secure by Letters Patent, is:

1. As an article of manufacture, a device for reduplicating the angular relation of a rotatable magneto shaft to the housing of a magneto comprising a frame provided with an annular body having a central aperture and oppositely disposed ears projecting from said centrally apertured body, said ears having means for attaching the frame to the magneto housing in a known angular relationship, said central aperture for permitting the end of the magneto shaft to project therethrough, a plate adjustably mounted upon the frame above the aperture therein and carrying means to interfit with the end of said magneto shaft when adjusted to predetermined position, and means for clamping the plate to the frame in adjusted position.

2. As an article of manufacture, a device for reduplicating the angular relation of a rotatable magneto shaft to the housing of a magneto comprising a cup-shaped frame having oppositely disposed ears projecting from the top side of the frame and in a plane above the bottom of the frame for attaching the frame to the magneto housing with its top side outermost, means provided in the housing and the frame for aligning them in a known angular relationship, a plate mounted upon the frame in the cup portion and carrying means to interfit with the end of said magneto shaft when adjusted to predetermined position, and means for clamping the plate to the frame in adjusted position.

3. As an article of manufacture, a device for reduplicating the angular relation of a rotatable magneto shaft to the housing of a magneto comprising a frame having a centrally apertured body portion and oppositely disposed ears projecting from said centrally apertured body portion, said ears having means for attaching the frame to the magneto housing in a known angular relationship, a plurality of fastening receiving means radially disposed about the central aperture at equi-distance from the center thereof, a plate provided with a plurality of circumferentially disposed slots, one slot being adjacent each of said fastening receiving means, means on the plate for interfitting with the magneto shaft when adjusted to predetermined position, and fastening means inserted through the slots to engage the fastening receiving means for clamping the plate to the frame in adjusted position.

4. As an article of manufacture, a device for reduplicating the angular relation of a magneto shaft to the housing comprising the combination set forth in claim 3 in which the centrally-apertured body portion of the frame lies in a plane displaced laterally from the plane of the oppositely disposed ears and the plate lies in a plane between that of the apertured body portion and the plane of the ears.

5. In a device for reduplicating the angular relation of a rotatable magneto shaft to the housing of the magneto, said magneto shaft being shaped on its end with a deformed portion and said housing having fastening receiving means, the combination of a frame having a central portion with an aperature provided for said shaft, so that said shaft may freely enter therein and protrude from the other side when said frame is fastened to the housing; a plate provided with means interfitting the deformed portion on the protruding end of said shaft only when rotated to a predetermined angle in respect to the shaft; means to fasten said plate to said frame when said plate is interfitted on the end of the shaft, whereby, when said plate and frame are fastened together, the frame and plate may be unfastened from the housing and shaft, thereby reduplicating by the setting of the plate on the frame the angular relation of the magneto shaft to the housing, said frame having a pair of laterally extending ears diametrically opposite each other and offset from the plane of the central portion of said frame, said ears having openings to receive means for fastening the frame to housing, and means for fastening the frame, in known angular relation, to the fastening receiving means in the housing, said plate being rotatable on said frame between the opposite ears of the frame.

6. As an article of manufacture, a device for reduplicating the angular relation of a rotatable magneto shaft to the housing of a magneto comprising a frame having a centrally-apertured body provided with means for attaching said frame to the magneto housing in a known angular relationship, a plurality of fastening receiving means radially disposed about the central aperture equidistant from the center thereof, a plate provided with a plurality of circumferentially disposed slots, one slot being adjacent each of said fastening receiving means, means on the plate for interfitting with the magneto shaft when adjusted to predetermined position, and fastening means inserted through the slots to engage the fastening receiving means for clamping the plate to the frame in adjusted position.

CHARLES R. JOHN.

REFERENCES CITED

The following references are of record in the file of this patent:

UNITED STATES PATENTS

| Number | Name | Date |
| --- | --- | --- |
| 1,826,997 | Dietrich | Oct. 13, 1931 |
| 1,957,432 | Barnes | May 8, 1934 |
| 2,090,020 | Ballou | Aug. 17, 1937 |
| 2,202,317 | Peterson | May 28, 1940 |
| 2,218,048 | Meyer | Oct. 15, 1940 |
| 2,316,188 | Rose | Apr. 13, 1943 |
| 2,341,284 | Payne | Feb. 8, 1944 |
| 2,431,100 | Woods | Nov. 18, 1947 |
| 2,437,283 | Viers | Mar. 9, 1948 |

FOREIGN PATENTS

| Number | Country | Date |
| --- | --- | --- |
| 116,248 | Great Britain | June 13, 1918 |